(12) United States Patent
Yonehana et al.

(10) Patent No.: US 7,210,548 B2
(45) Date of Patent: May 1, 2007

(54) ELECTRIC POWERED VEHICLE

(75) Inventors: Atsushi Yonehana, Saitama (JP); Taku Okuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 11/085,853

(22) Filed: Mar. 22, 2005

(65) Prior Publication Data
US 2005/0217910 A1 Oct. 6, 2005

(30) Foreign Application Priority Data
Mar. 31, 2004 (JP) ............................. 2004-102142

(51) Int. Cl.
*B62K 11/02* (2006.01)
(52) U.S. Cl. ..................... 180/68.5; 180/220
(58) Field of Classification Search ............... 180/220, 180/68.5
See application file for complete search history.

(56) References Cited

U.S. PATENT DOCUMENTS 5,853,058 A 12/1998 Endo et al.
6,155,369 A * 12/2000 Whittaker .................. 180/220
6,629,574 B2 * 10/2003 Turner ........................ 180/206

FOREIGN PATENT DOCUMENTS

| GB | 2307218 | 5/1997 |
| JP | 05112270 A | 5/1993 |
| JP | 11255165 A | 9/1999 |
| JP | 2000-118469 | 4/2000 |
| JP | 2002-037162 | 2/2002 |

* cited by examiner

*Primary Examiner*—Kevin Hurley
(74) *Attorney, Agent, or Firm*—Carrier, Blackman & Associates, P.C.; Joseph P. Carrier; William D. Blackman

(57) ABSTRACT

An electric powered vehicle which is powered by an electric motor via a battery, includes a front frame which extends diagonally downward toward the rear of the vehicle from the head pipe, an intermediate frame which is bent toward the rear of the vehicle at the bottom end of the front frame and which is substantially horizontally extending toward the rear of the vehicle, and a rear frame which extends from the intermediate frame diagonally upward toward the rear of the vehicle. A front portion of the intermediate frame includes a partition plate extending diagonally upward toward the rear. The battery is retained within the intermediate frame, and restrained from motion in the longitudinal direction, by the partition plate and the rear frame. This structure provides an electric powered vehicle whose battery is effectively and removably mountable on the body frame in a limited space thereof.

15 Claims, 6 Drawing Sheets

ELECTRIC POWERED VEHICLE

CROSS-REFERENCE TO RELATED APPLICATIONS

The present invention claims priority under 35 U.S.C. 119 based on Japanese patent application No. 2004-102142, filed on Mar. 31, 2004. The subject matter of this priority document is incorporated by reference herein.

BACKGROUND OF THE INVENTION

1. Field of the Invention

The present invention relates to an electric powered vehicle, and more particularly to an electric powered vehicle whose battery is efficiently and removably mountable on the body frame in a limited space thereof.

2. Background of the Invention

In addition to a conventional motorcycle whose drive source is an internal combustion engine, research has been conducted on an electric motorcycle whose drive source is an electric motor. In this vehicle, the electric motor is powered using a battery. In such an electric motorcycle, since the ratio of a battery weight to the total weight of a vehicle body is large, the mounting position of the battery becomes significant. A technology for a scooter-type electric motorcycle where a battery is housed below a step floor thereof is disclosed in Japanese Patent Application Laid-open No. Hei 11-255165 and in Japanese Patent Application Laid-open No. Hei 5-112270.

In the disclosed technology of these references, a battery is housed in a battery case and the battery case is mounted on a vehicle body frame. As a result, the battery case and a fastening tool for fastening this battery case to the vehicle body frame are indispensable components of the vehicle. Accordingly, the number of vehicle parts is increased. Thus, both the manufacturing cost and the number of processes thereof are increased. In addition, the weight of the vehicle body is increased because of the necessity of providing a battery case having sufficient rigidity for mounting a heavy object such as the battery, and the necessity of a rigid connecting member between the case and the vehicle frame. Hence, the increase in vehicle weight provides a technical problem.

An object of the present invention is to solve the above-described disadvantages and problem of the conventional technology, and to provide an electric powered vehicle wherein the number of parts and the weight are not increased relative to a conventionally powered vehicle.

SUMMARY OF THE INVENTION

In order to achieve the above-described object with respect to an electric vehicle which runs using an electric motor powered by a battery, the present invention resides in plural and various novel features described as follows.

The electric vehicle of the present invention includes a head pipe on which a handlebar is supported and is freely steerable. The electric powered vehicle also includes a front frame which is provided in a way that it is extended diagonally downward to the backward direction from the head pipe, an intermediate frame which is provided in a way that it is bent at a lower end portion of the front frame and is extended substantially horizontally, and a rear frame which is connected to an end portion the intermediate frame, and extends diagonally upward to the backward direction. The electric powered vehicle further includes a partition plate which extends diagonally upward to the backward direction at a front portion of the intermediate frame, and a battery housing part which is disposed in the intermediate frame and restrained from motion in the longitudinal direction by the partition plate and the rear frame.

Accordingly, a battery can be mounted in a highly stiff intermediate frame, and since the movement in the longitudinal direction can be restrained by the partition plate and the rear frame, conventional need for a battery case and a fastening tool, which are rigid, to fasten the battery is eliminated, hence accomplishing a reduction in the number of parts.

In the electric powered vehicle according to a second aspect of the invention, the angles of inclination of the partition plate and the rear frame, each of which is inclined to the backward direction, are substantially same.

In addition, in the electric powered vehicle according to a third aspect of the invention, the angles of inclination of a front face and a back face of the battery in the longitudinal direction are substantially same as the angles of inclination of the partition plate and the rear frame, respectively.

Accordingly, the battery whose sectional shape along a long side forms substantially a parallelogram can be housed within a small allowable space without a loss in the ease of mounting and removing thereof.

In addition, in the electric powered vehicle according to a fourth aspect of the invention, the partition plate is disposed in the vicinity of a bent portion joining the front frame and the intermediate frame.

Accordingly, since the distance between the partition plate and the rear frame is made long, the size of a battery to be mounted therein can be correspondingly large.

In addition, in the electric powered vehicle according to a fifth aspect of the invention, the intermediate frame has a form which includes a pair of left and right side walls along a direction where the intermediate frame is extended and provided, and the battery housing part is surrounded by the pair of left and right side walls, the partition plate, and an insertion part of the rear frame.

Accordingly, since the lateral movement of the battery is restrained by the sidewalls of the intermediate frame, a fastening tool conventionally used for restraining the lateral movement of the battery becomes unnecessary.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

A preferred embodiment mode of the present invention is described hereinbelow with reference to the drawings.

Figure 1:
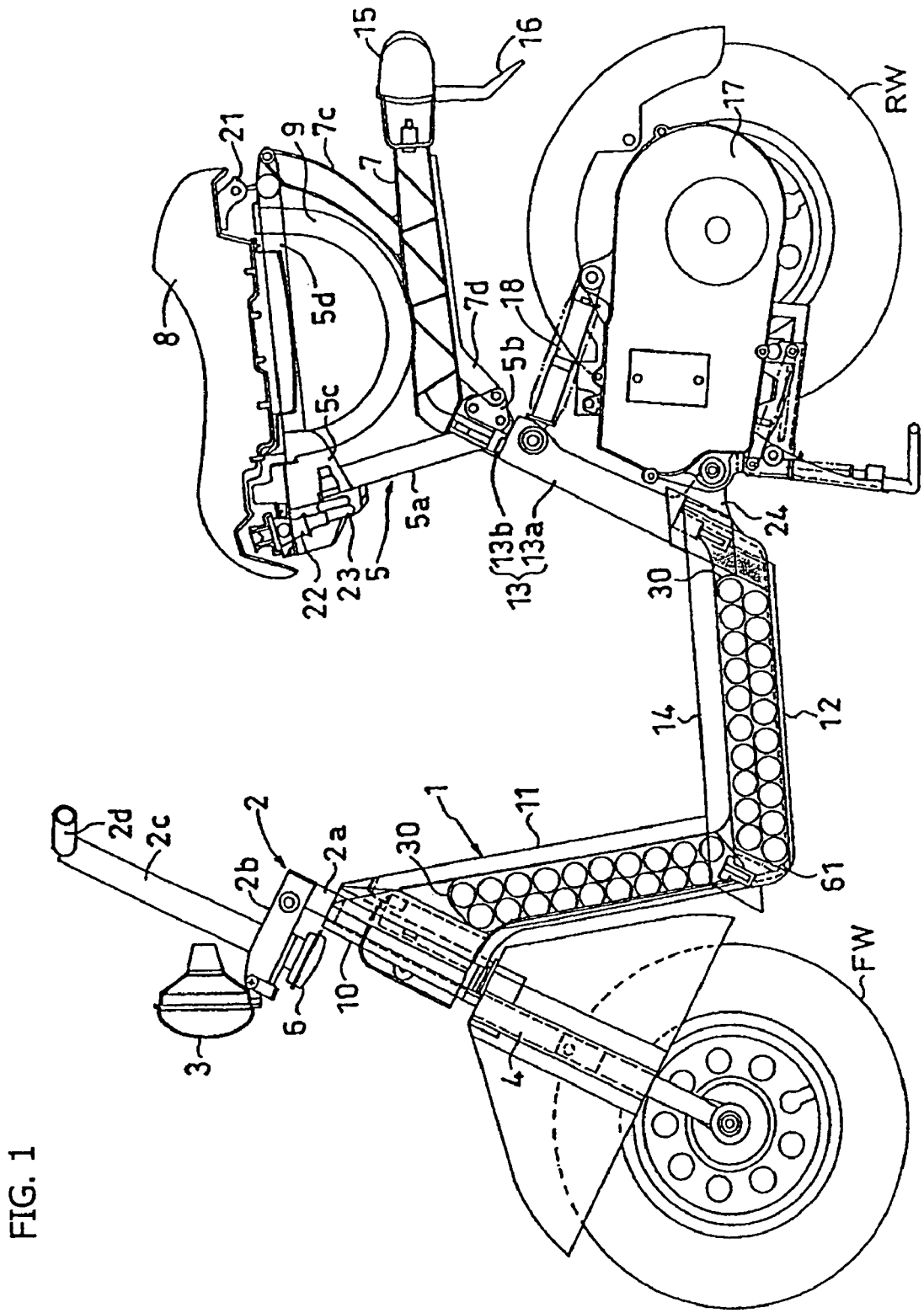
FIG. 1 is an overall side view of a scooter type electric powered motorcycle according to the present invention.

Referring first to FIG. 1, which is an overall side view of a scooter type electric powered motorcycle according to the present invention, a body frame 1 forms a frame for the vehicle. The body frame 1 includes a head pipe 10, a front frame 11 which extends diagonally downward toward the rear of the vehicle from the head pipe 10, an intermediate frame 12 which is bent toward the rear of the vehicle at the bottom end of the front frame 11 and which is substantially horizontally extending toward the rear of the vehicle, and a rear frame 13 which passes through the rear end of the intermediate frame 12 and which extends diagonally upward toward the rear of the vehicle. Each of these frames 11, 12, 13 is formed through processing of a highly rigid metal member. A battery package 30, which is described later, is housed in each of the intermediate frame 12 and the front frame 11. In addition, the intermediate frame 12 is covered by a step floor 14.

A steering unit 2 is supported on the head pipe 10 and is freely steerable thereon. The steering unit 2 includes a supporting pipe 2a which is supported by the head pipe 10 and is freely turnable, a handlebar pipe 2c connected to the top end of the supporting pipe 2a through a handlebar stay 2b, and a handlebar 2d which is provided on the top end of the handlebar pipe 2c. On the handlebar stay 2b, a head lamp 3 is provided at its end thereof, and a horn 6 is provided below. A pair of front forks is provided at left and right sides of the vehicle, and is connected to a lower portion of the supporting pipe 2a. On the bottom end of the front forks, a front wheel FW is rotatably supported.

The rear frame 13 consists mainly of a rear frame body 13a which is an exterior for the rear frame 13, and a rear frame pipe 13b which passes through the rear frame body 13a and is fixed to the interior thereof, an upper portion of the rear frame pipe 13b being exposed above the rear frame body 13a. A seat stay 5 and a rear combination stay 7 are connected to the upper end of the rear frame 13 at the exposed portion of the rear frame pipe 13b. A combination lamp 15, in which a brake lamp and a turn indicator lamp are integrally provided, is disposed at the rear end of the rear combination stay 7. A license plate holder is provided below the combination lamp 15.

The seat stay 5 consists mainly of a seat post 5a, a fastening bracket 5b which is integrated with this seat post 5a and which fastens the seat post 5a to the exposed portion of the rear frame pipe 13b, and a ring-shaped helmet holder 5d which is fixed to an upper portion of the seat post 5a with a connecting stay 5c and which extends toward the rear of the vehicle. A mounted seat 8 is supported on an upper portion of the seat stay 5. The seat 8 is permitted to freely open and close, and includes a supporting part 21 formed at the rear end of the helmet holder 5d. A plug 22 is housed inside the connecting stay 5c. The plug 22 permits connection to an external electric source in order to charge the battery package 30, and includes an extension cord 23. A helmet 9 is placed upside down inside the helmet holder 5d.

In the present embodiment, the seat stay 5 and its fastening bracket 5b are highly rigid, and the seat post 5a is firmly fastened to the rear frame 13 with the fastening bracket 5b, such that almost all the load that acts on the seat stay 5 through the mounted seat 8 is supported by the rear frame 13 through its fastening bracket 5b.

A swing unit 17, which houses an electric motor and serves as the power source that drives the rear wheel RW, is freely swingably connected to and supported on the rear end of the intermediate frame 12 via a linkage member 24. An upper portion of the swing unit 17 is connected to an upper portion of the rear frame body 13a via a rear suspension 18.

Figure 2:
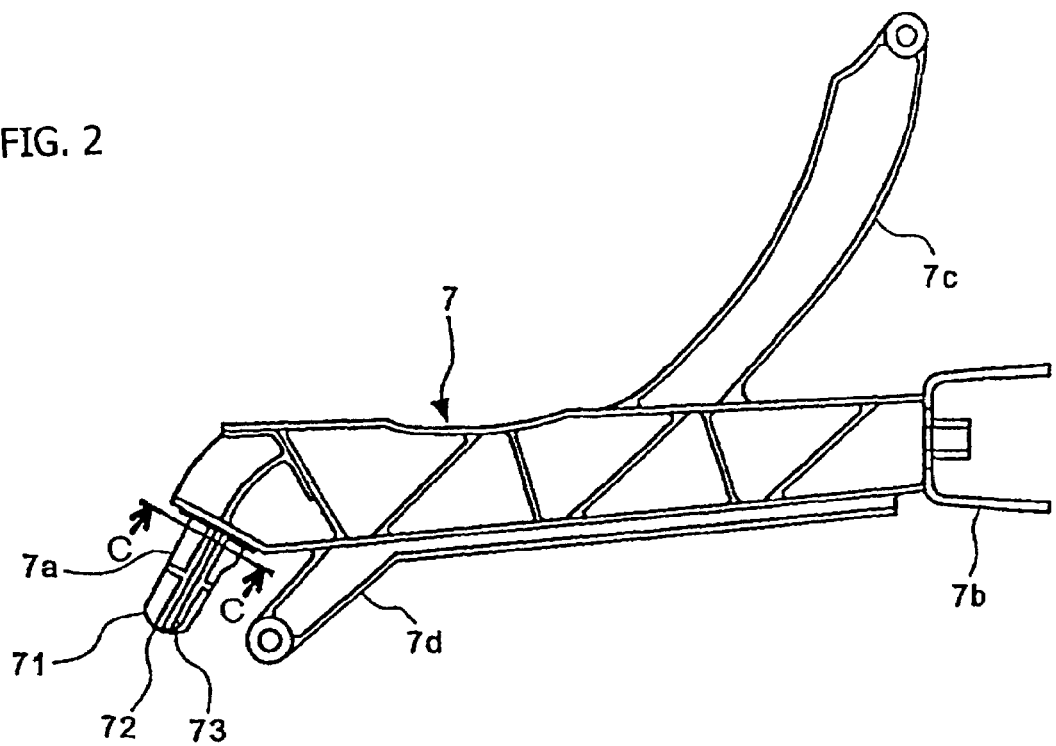
FIG. 2 is a side view of a rear combination stay.
Figure 3:
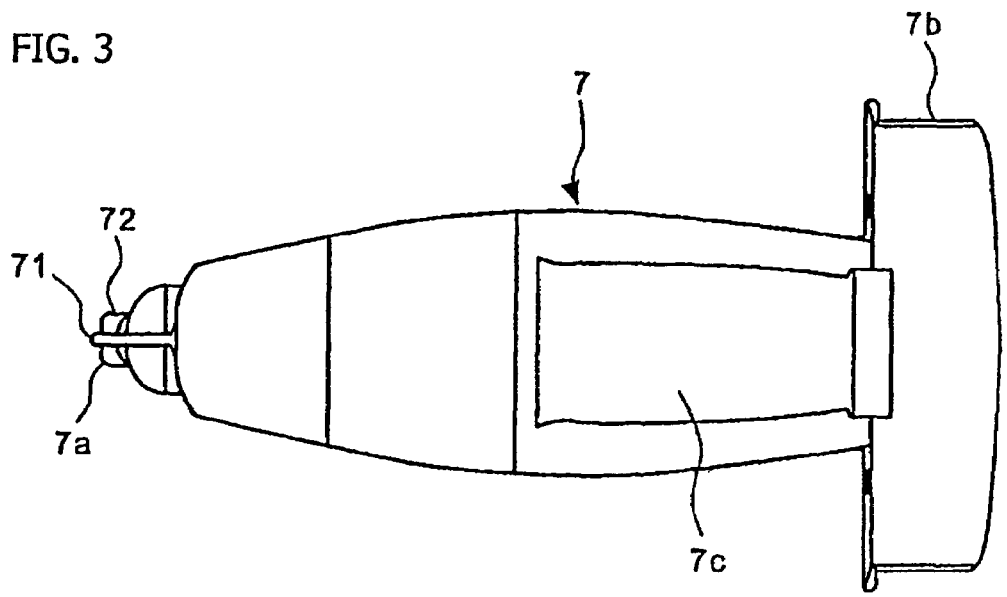
FIG. 3 is a top view of the rear combination stay.

FIG. 2 is a side view of the rear combination stay 7, and FIG. 3 is a top view thereof. In the present embodiment, since almost all the load that acts on the seat stay 5 is supported on the rear frame 13 with the fastening bracket 5b, it is possible to cause a load that acts on the rear combination stay 7 to be small. Accordingly, unlike the frame members 11, 12, 13 and the seat stay 5 which are required to be highly rigid, the rear combination stay 7 is formed by a light weight member made of resin or of aluminum.

At the front end of the rear combination stay 7, an insertion supporting part 7a is formed. The insertion supporting part 7a is directed diagonally downward toward the front of the vehicle, and a holder 7b is formed at the rear end of the rear combination stay 7. The combination lamp 15 is fastened to holder 7b. Furthermore, a supporting part 7c is formed on the upper surface of the rear combination stay 7. The supporting part 7c is connected to the rear end of the seat stay 5 and is oriented diagonally upward toward the rear of the vehicle, and is curved and mounted in a standing manner. A supporting stay 7d is provided on the lower surface of the rear combination stay 7. As shown in FIG. 1, the rear combination stay 7 is connected to the rear frame 13 in such a manner that the insertion supporting part 7a, provided at the front end of the rear combination stay 7, is inserted into an upper opening of the rear frame pipe 13b. Further, the supporting stay 7d is fastened to the fastening bracket 5b by being screwed thereinto and is connected to the rear frame 13.

Figure 10:
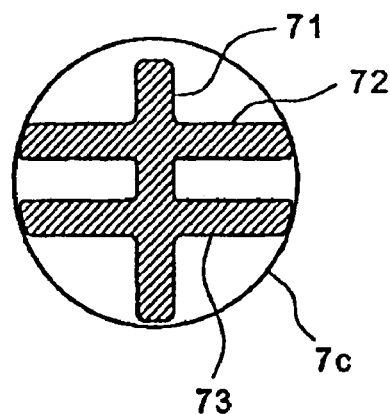
FIG. 10 is a sectional view taken along the line C—C in FIG. 2.
Figure 11:
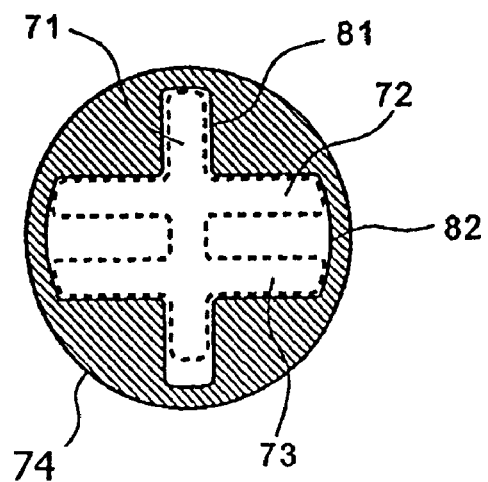
FIG. 11 is a sectional view showing a way to position the rear combination stay relative to a rear frame pipe.

FIG. 10 is a sectional view of the insertion supporting part 7a taken along the line C—C in FIG. 2, where it is shown that a plurality of ribs 71, 72 and 73 are so formed that these ribs are orthogonal one another. As shown in FIG. 11, inside the upper end of the rear frame pipe 13b, there is inserted and fixed a boss 74 on which grooves 81 and 82 are formed. The plurality of ribs 71, 72 and 73 fit into the grooves 81 and 82 when the rear combination stay is mounted to rear frame 13. The respective ribs 71, 72 and 73 of the insertion supporting part 7a and the respective grooves 81 and 82 cooperatively function as a positioning tool to set a relationship for the relative position between the rear combination stay 7 and the rear frame 13, by inserting the insertion supporting part 7a into the upper end of the rear frame pipe 13b in such a way that the ribs 71, 72, and 73 are engaged with each grove 81, 82 of the boss 74. The rear combination stay 7 can be provided by extending itself into the regular direction from the rear frame pipe 13b.

Figure 4:
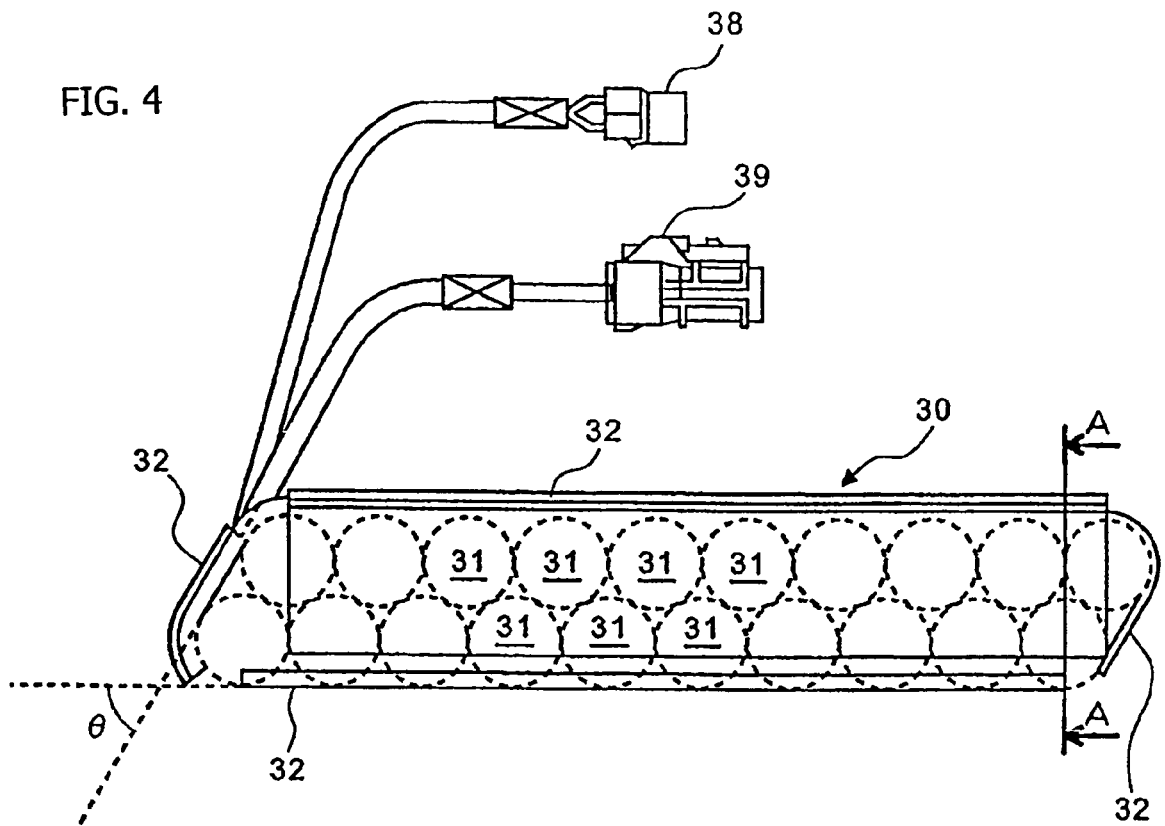
FIG. 4 is a side view of a battery package.
Figure 5:
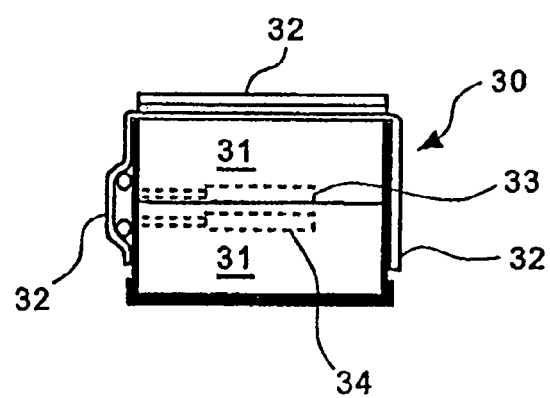
FIG. 5 is a sectional view taken along the line A—A in FIG. 4.

FIG. 4 is a side view of the battery package 30. A battery package 30 is housed in each of the front frame 11 and the intermediate frame 12. FIG. 5 is a sectional view taken along the line A—A in FIG. 4. In the present embodiment, for the sake of versatility thereof, the same battery packages 30 are housed in the frames 11 and 12 respectively.

The battery package 30 is configured in a manner that a plurality of Ni-MH battery cells 31 are stacked with two tiers, and are shrink packed in a configuration in which a sectional shape thereof along a long side forms substantially a parallelogram. As seen in FIG. 4, the long sides of the parallelogram reside at an angle θ relative to the short sides of the parallelogram, as dictated by the offset-stacked relationship of the individual cells 31. The exterior portion thereof is protected by a plurality of rubber sheets 32. In each of the spaces between the respective battery cells 31, a thermistor 33 serving as a temperature sensor and a temperature fuse 34 are housed, and the wire lead of every thermistor 33 is connected to an external device through a connector 38. The positive and negative electric source lines of the battery cells, which are connected in series, are externally led out through a connector 39.

Figure 6:
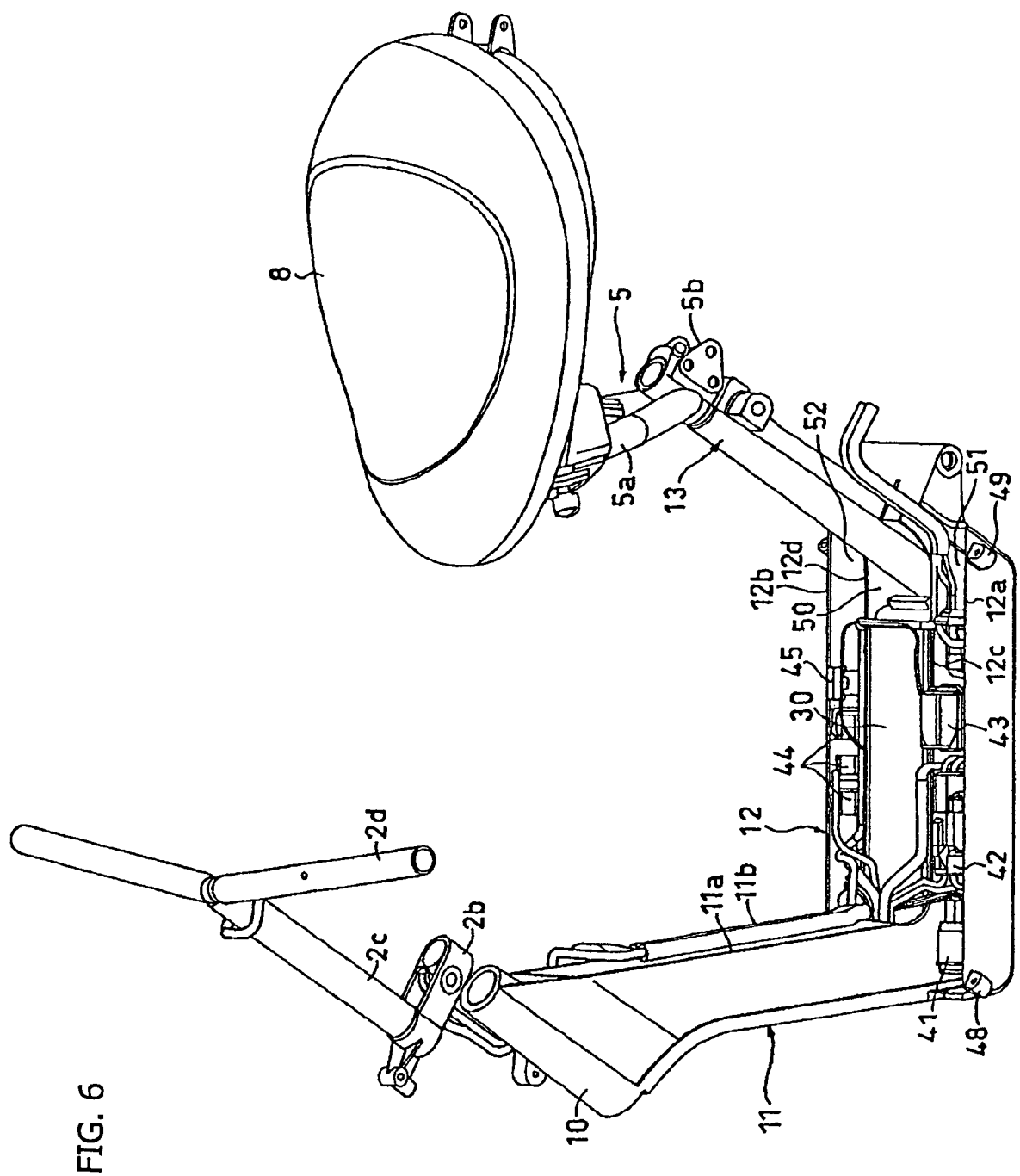
FIG. 6 is a perspective view of the body frame 1 viewed from a point in space located diagonally upward to the left.

FIG. 6 is a perspective view of the body frame 1 viewed from a point in space located diagonally upward and to the left of the vehicle. When previously used reference numerals are used in FIG. 6, these reference numerals denote the same as or equivalent components to those in other figures.

In each of the front frame 11 and the intermediate frame 12, sidewalls are formed on the frame in a standing manner along both sides thereof in the longitudinal direction (traveling direction) of the vehicle. Specifically, the exterior walls 11a, 11b and 12a, 12b are formed in a standing manner on the front frame 11 and the intermediate frame 12, respectively. Furthermore, on the intermediate frame 12, interior walls 12c, 12d are formed inside the exterior walls 12a, 12b, in a standing manner. In other words, the exterior walls 11a, 11b, 12a, 12b and the interior walls 12a and 12b are wall portions which are integral with, and extend normally from, a base portion of the respective frames 11, 12.

The lower end portions of the external walls 11a, 11b of the front frame 11 are continuous with the internal walls 12c, 12d of the intermediate frame 12. The step floor 14 is fastened on the upper external surface of the external wall 12a, 12b using screws (not shown). Screw receivers 48, 49 are formed on the external wall 12a, 12b to receive these screws. Screw receivers 48, 49 are provided in a position inclined diagonally backward, in a manner similar to the rear frame 13.

The battery package 30 is housed in a battery housing part 50 interposed between the pair of interior walls 12c, 12d of the intermediate frame 12. In a left housing part 51 interposed between the exterior wall 12a and the interior wall 12c, small parts that includes a turn indicator light relay 41 and a battery coupler 42, and a fuse box 43 are housed. In a right housing part 52 interposed between the exterior wall 12b and the interior wall 12d, a coupler 44 and a blade fuse case 45 are housed. The rear frame 13 is inserted into and fixed to a rear portion of the battery housing part 50. In addition, a second battery package 30 is housed on the front frame 11 in a battery housing part interposed between the exterior walls 11a and 11b thereof.

Figure 7:
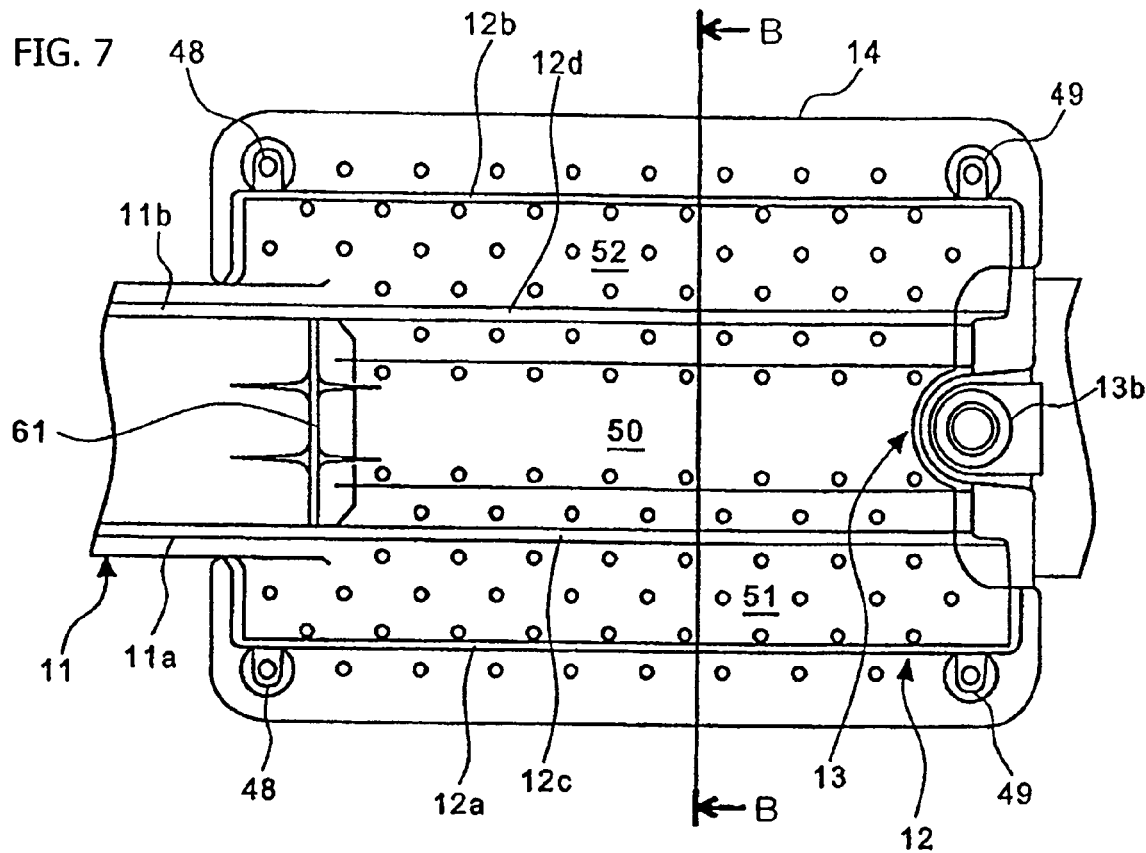
FIG. 7 is a perspective projection view of an intermediate frame, viewed down over the step floor 14 from a point in space located upward and along a visual line in parallel with a rear frame.
Figure 8:
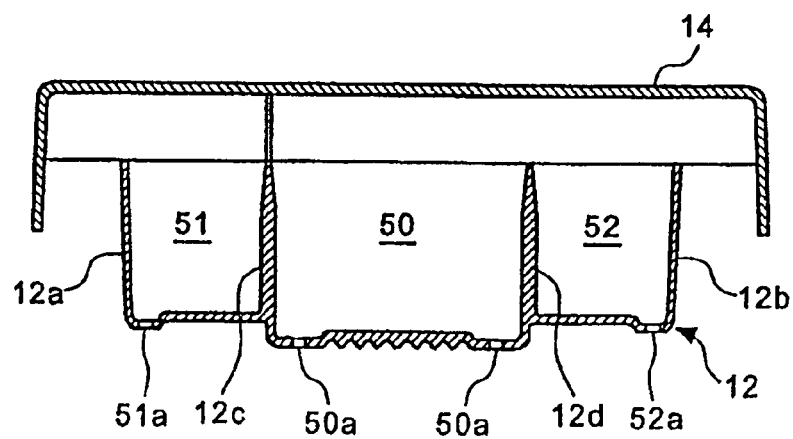
FIG. 8 is a sectional view taken along the line B—B in FIG. 7.

FIG. 7 is a perspective projection view of the intermediate frame 12, viewed downward over the step floor 14 from a point in space located above and along a visual line in parallel with the rear frame 13. FIG. 8 is a sectional view taken along the line B—B in FIG. 7. Here, the battery package 30 to be housed in the intermediate frame 12, the drawings of various kinds of relays, couplers and the like are omitted.

Figure 9:
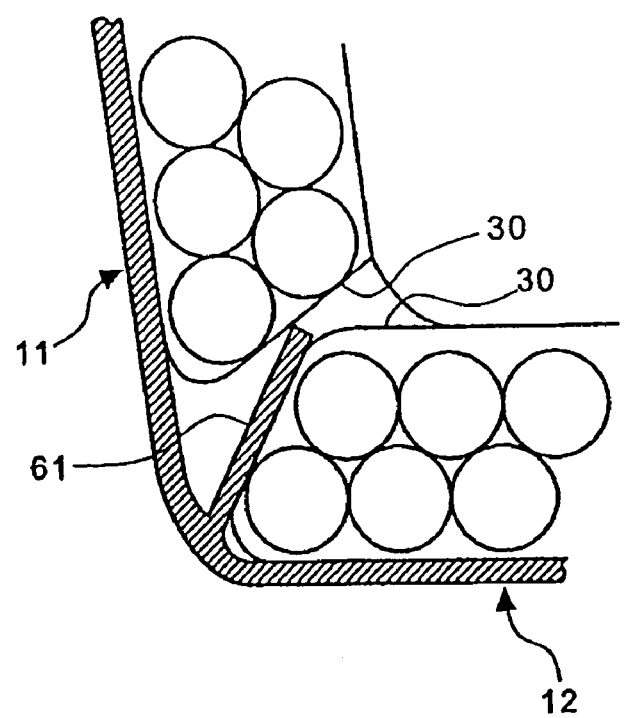
FIG. 9 is a section view of a partition plate and the neighborhood thereof.

At the bottom of each of the battery housing part 50, the left housing part 51 and the right housing part 52, heat radiation holes 50a, 51a and 52a are provided as shown in FIG. 8. As shown in FIG. 7, a partition plate 61 is formed in a standing manner so as to extend diagonally upward and toward the rear of the vehicle within the battery housing part 50. The partition plate 61 is interposed between the interior walls 12c and 12d of the intermediate frame 12. The angle of inclination of the partition plate 61 is substantially the same as that of the rear frame 13. The partition plate 61, as enlarged in side sectional view in FIG. 9, is disposed in the vicinity of a bent portion which joins the front frame 11 and the intermediate frame 12. In addition, in the present embodiment, although the description has been made with regard to an example represented by the structure where the heat radiation holes 50a, 51a and 52a are provided at the bottom of the intermediate frame 12, alternatively, a ship-bottom-shaped frame with no hole at its bottom may be adopted.

The space between the partition plate 61 and the rear frame 13 is defined according to the width of the battery package 30 in the longitudinal direction. The angle of inclination of the partition plate 61 substantially coincides with the angle θ defined by the exterior shape of the battery package 30 (see FIG. 4). As a consequence, in the present embodiment, the position of the battery package 30 is maintained within the battery housing part 50 with respect to its right and left directions using the interior walls 12c and 12d, and is maintained with respect to the longitudinal direction using the partition plate 61 and the rear frame 13. As a result, the battery package is securely housed with a small space allowance. Therefore, a heavy object such as a battery package 30 can be mounted on the highly rigid intermediate frame, and a conventional solid battery case for housing a battery package and a conventional fastening tool become unnecessary in the present invention.

The installation and removal of the battery package 30 are achieved by insertion and detachment thereof in the inclined direction where the partition plate 61 and the rear frame 13 are made inclined. The partition plate 61, as shown in FIG. 9, serves as a supporting portion to prop up a second battery package 30 which is housed in the front frame 11. Therefore, there is no need for an additional fastening tool and an additional solid battery case to house the second battery package which is to be housed in the above-described frame according to the present invention.

While a working example of the present invention has been described above, the present invention is not limited to the working example described above, but various design alterations may be carried out without departing from the spirit and scope of the present invention as set forth in the claims.

What is claimed is:

1. An electric vehicle which is driven by a battery-powered electric motor, the vehicle comprising:
   a head pipe on which a handlebar is supported and is freely steerable;
   a front frame extending from the head pipe diagonally downward toward the rear of the vehicle;
   an intermediate frame comprising a bent portion at a lower end portion of the front frame, the intermediate frame extending substantially horizontally from the bent portion;
   a rear frame connected to an end portion of the intermediate frame, the rear frame extending diagonally upward toward the rear of the vehicle at a first angle;
   a partition plate provided at a front portion of the intermediate frame, the partition plate extending from the intermediate frame at a second angle so as to extend diagonally upward toward the rear of the vehicle; and a battery positioned in the intermediate frame, the battery being restrained from motion in the longitudinal direction of the vehicle by the partition plate and the rear frame.

2. The electric vehicle according to claim 1, wherein first and second angles are substantially the same.

3. The electric vehicle according to claim 2, wherein angles of inclination of a front face and a back face of the battery in the longitudinal direction are substantially same as the first and second angles, respectively.

4. The electric vehicle according to claim 1, wherein the partition plate is disposed adjacent to the bent portion joining the front frame and the intermediate frame.

5. The electric vehicle according to claim 1, wherein the intermediate frame includes a pair of left and right side walls extending in a longitudinal direction of the vehicle, and wherein the battery is surrounded by the pair of left and right side walls, the partition plate, and an insertion part of the rear frame.

6. The electric vehicle according to claim 1, further comprising a second battery retained within the front frame.

7. The electric vehicle according to claim 1, further comprising a second battery retained within the front frame, and a lower surface of the second battery is supported by the partition plate.

8. The electric vehicle according to claim 1, wherein
the intermediate frame includes a base having intermediate frame left and right sidewalls extending substantially normally therefrom,
the front frame includes a base having front frame left and right sidewalls extending substantially normally therefrom,
wherein the battery is surrounded by the pair of intermediate frame left and right sidewalls, the electric vehicle further comprises a second battery which is surrounded by the pair of front frame left and right sidewalls, and the partition plate retains both said batteries within the respective intermediate and front frames.

9. The electric vehicle according to claim 1, wherein
the intermediate frame includes a base having intermediate frame left and right sidewalls extending substantially normally therefrom,
the front frame includes a base having front frame left and right sidewalls extending substantially normally therefrom, and
the intermediate frame left and right sidewalls are continuous with the front frame left and right sidewalls.

10. An electric vehicle which is driven by a battery-powered electric motor, the vehicle comprising
a head pipe on which a handlebar is supported and is freely steerable;
a front frame extending from the head pipe diagonally downward toward the rear of the vehicle;
a rear frame;
an intermediate frame extending substantially horizontally between a lower end of the front frame and the rear frame;
wherein the rear frame extends diagonally upward toward the rear of the vehicle at a first angle,
a partition plate provided at a location coinciding with the connection of the front frame to the intermediate frame, the partition plate extending diagonally upward toward the rear of the vehicle at a second angle substantially the same as the first angle, and
a battery positioned in the intermediate frame, the battery comprising angled end portions, and the battery being restrained from motion in the longitudinal direction of the vehicle by cooperation between the angled end portions, the partition plate and the rear frame.

11. The electric vehicle according to claim 10, wherein the intermediate frame includes a pair of left and right side walls extending in a longitudinal direction of the vehicle, and wherein the battery is surrounded by the pair of left and right side walls, the partition plate, and the rear frame.

12. The electric vehicle according to claim 10, further comprising a second battery retained within the front frame.

13. The electric vehicle according to claim 10, further comprising a second battery retained within the front frame, and a lower surface of the second battery is supported by the partition plate.

14. The electric vehicle according to claim 10, wherein
the intermediate frame includes a base having intermediate frame left and right sidewalls extending substantially normally therefrom,
the front frame includes a base having front frame left and right sidewalls extending substantially normally therefrom,
wherein the battery is surrounded by the pair of intermediate frame left and right sidewalls, the electric vehicle further comprises a second battery is surrounded by the pair of front frame left and right sidewalls, and the partition plate retains both said batteries within the respective intermediate and front frames.

15. The electric vehicle according to claim 10, wherein
the intermediate frame includes a base having intermediate frame left and right sidewalls extending generally normally therefrom,
the front frame includes a base having front frame left and right sidewalls extending generally normally therefrom, and
the intermediate frame left and right sidewalls are continuous with the front frame left and right sidewalls.

* * * * *